US008285047B2

(12) United States Patent
Nagarajan et al.

(10) Patent No.: US 8,285,047 B2
(45) Date of Patent: Oct. 9, 2012

(54) AUTOMATED METHOD AND SYSTEM FOR NAMING DOCUMENTS FROM A SCANNED SOURCE BASED ON MANUALLY MARKED TEXT

(75) Inventors: Ramesh Nagarajan, Pittsford, NY (US); Matthew John Nolepa, Chalfont St. Peter (GB)

(73) Assignee: Xerox Corporation, Norwalk, CT (US)

( * ) Notice: Subject to any disclaimer, the term of this patent is extended or adjusted under 35 U.S.C. 154(b) by 1175 days.

(21) Appl. No.: 11/866,913

(22) Filed: Oct. 3, 2007

(65) Prior Publication Data

US 2009/0092317 A1    Apr. 9, 2009

(51) Int. Cl.
*G06K 9/00* (2006.01)

(52) U.S. Cl. ........ 382/175; 382/176; 382/317; 382/321; 358/403; 358/462; 715/230; 715/256; 715/780

(58) Field of Classification Search ........................ None
See application file for complete search history.

(56) References Cited

U.S. PATENT DOCUMENTS

| | | | | |
|---|---|---|---|---|
| 5,692,073 A * | 11/1997 | Cass | | 382/219 |
| 5,734,882 A * | 3/1998 | Lopresti et al. | | 345/179 |
| 5,778,378 A * | 7/1998 | Rubin | | 1/1 |
| 6,457,018 B1 * | 9/2002 | Rubin | | 707/742 |
| 6,707,466 B1 * | 3/2004 | Van Sickle et al. | | 345/641 |
| 7,039,232 B2 | 5/2006 | Nagarajan et al. | | |
| 2003/0190145 A1 * | 10/2003 | Copperman et al. | | 386/69 |
| 2004/0139391 A1 * | 7/2004 | Stumbo et al. | | 715/512 |
| 2004/0190772 A1 * | 9/2004 | Constantin et al. | | 382/175 |
| 2007/0067713 A1 * | 3/2007 | Ming | | 715/511 |

* cited by examiner

*Primary Examiner* — John Lee
(74) *Attorney, Agent, or Firm* — Pillsbury Winthrop Shaw Pittman, LLP

(57) ABSTRACT

A method for associating text with image data of documents is herein described. The method includes receiving image data of a document with manually marked text and recognizing the manually marked text. The image data is then annotated (e.g., tagged) using the manually marked text and the image data of the document is stored. When manually marked text is recognized, recognized text may be generated for annotating the image data of the document and used to populate a field associated with the image data. The field may be a name of the document or a subject line of an e-mail message, for example. A method including identifying the location of manually marked text in a first scanned document to automatically identify and annotate text in a corresponding location in a second scanned document is also disclosed.

10 Claims, 6 Drawing Sheets

AUTOMATED METHOD AND SYSTEM FOR NAMING DOCUMENTS FROM A SCANNED SOURCE BASED ON MANUALLY MARKED TEXT

BACKGROUND

1. Field

The present disclosure is generally related to methods and systems for associating text with scanned documents. More specifically, the present disclosure is generally related to methods and systems for identifying and associating text with documents based on manually marked text from a scanned source.

2. Background

Often, it is desirable to differentiate between regions of a document which have been manually marked, for example, with a highlighter pen from regions of a document which have not been highlighted. The term "manually marked" is intended to mean herein that first marks in a document have been differentiated from remaining marks of the document by a region which has a substantially different gray scale than the background or marks of the original document. Such marks can be made, for example, by way of writing instruments such as pens or markers (e.g., highlighters) which produce bright or fluorescent but relatively transparent colors. Alternatively, such marks may be made electronically, such as in a word processing document using a highlighting or marking option.

A variety of methods have been proposed for the detection of manually marked or highlighted regions in a document. For example, the use of a color scanner has been proposed to detect regions of a document which have been highlighted in a color different than the remainder of the document. Other processing methods utilize detection of an image, which may include shadow, mid-tone, and bright portions. A mid-tone portion may be screened with a low frequency screen to convert the image into a binary form, for example.

Electronic storage of documents has facilitated the handling of large volumes of documents, such as those handled by law firms, hospitals, universities, government institutions, and the like. Typically, the documents are entered into massive storage systems by use of a scanner system that converts text into electronic data. Once the documents are scanned, each document must be manually named or re-named (i.e., requiring user intervention by accessing a file or electronic data) with an unique name or identification number (e.g., docket number, insurance provider and claim number, financial application number, etc.) so that the scanned documents are easily identified when there is a need to retrieve the documents from the computer storage system. However, the need to manually rename each scanned document may be cumbersome and provide undue burden for a user when dealing with heavy scanning application workflows. Additionally, when multiple users are independently scanning documents, each user may utilize a non-uniform method of naming documents. Therefore, the ability to recognize, sort, or locate a document in a computer storage system, for example, may be difficult.

SUMMARY

One aspect of the disclosure provides a method for associating text with image data of a document. The method includes receiving image data for a document with manually marked text and recognizing the manually marked text in the image data. The method also includes annotating the image data using the manually marked text, and storing the annotated image data.

Another aspect of the disclosure provides a method for automatically identifying and associating text with scanned documents. The method includes scanning a first scanned document into image data and recognizing the manually marked text in the image data of the first scanned document. A location of the manually marked text in the image data of the first scanned document is identified, and the location of the manually marked text is stored. A second document is then scanned into image data and the image data for the second document is stored. The location of the manually marked text in the first scanned document may be used to identify a corresponding location in the second scanned document, such that a text in the corresponding location of the second scanned document is recognized, and the image data for the second scanned document is annotated with the recognized text.

Another aspect of the disclosure provides a system for automatically identifying and associating text in a scanned document. The system includes a module for scanning a first document having manually marked text into image data; a module for recognizing the manually marked text in the image data of the first scanned document; a module for identifying a location of the manually marked text in the image data of the first scanned document; and a module for storing the location of the manually marked text. A module for scanning a second document into image data and a module for storing the image data for the second scanned document are also provided. The module for identifying the location of the manually marked text in the image data of the first scanned document is configured to identify a corresponding location in a second scanned document and configured to recognize a text in the corresponding location of the second scanned document. The image data for the second scanned document is annotated with the recognized text.

In an aspect of the disclosure, the annotating of the scanned document includes naming the scanned document. In an aspect of the disclosure, recognized text may be generated in response to recognizing the manually marked text, and the image data of the scanned document may be recognized with the recognized text. In another aspect, a field associated with the image data of a scanned document may be populated using the recognized text. The field may be the name of the image data of the scanned document, for example.

Other objects, features, and advantages of the present disclosure will become apparent from the following detailed description, the accompanying drawings, and the appended claims.

DETAILED DESCRIPTION OF THE PREFERRED EMBODIMENT(S)

The disclosure herein describes a system and methods of identifying an area(s) of interest in a scanned and/or input document, and, using the information identified, extracts the information as a unique identifier (e.g., a word, number, name, etc.) for the scanned document. The unique identifier is then automatically associated with the scanned document. The term automatically is intended herein to mean that user intervention is not required.

Figure 1:
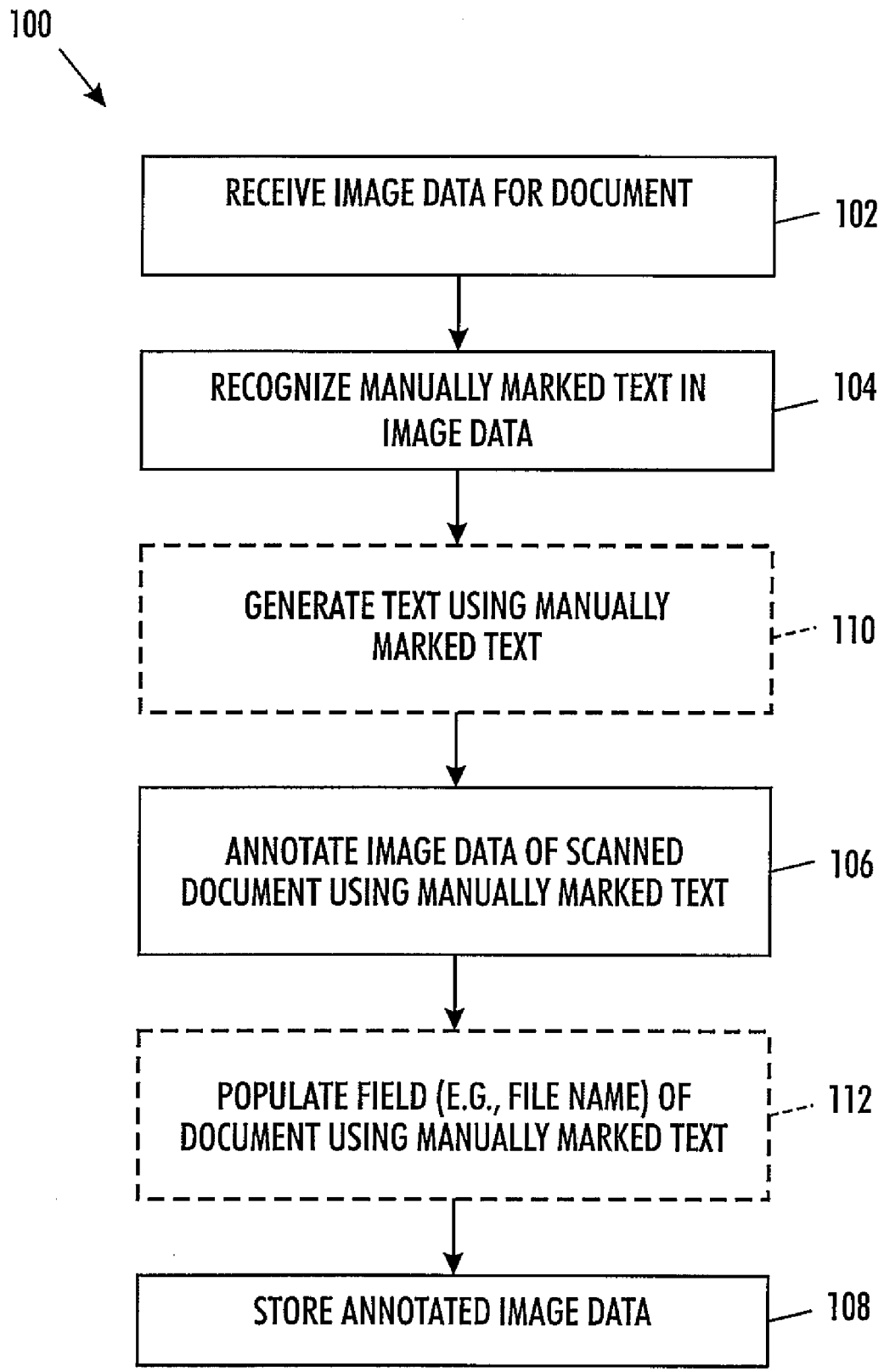
FIG. 1 shows a flow diagram for a method for associating text with image data of a document in accordance with an embodiment of the present disclosure.

FIG. 1 shows a flow diagram for a method 100 for associating text with scanned documents in accordance with an embodiment. The method 100 comprises receiving image data for a scanned document 102 with manually marked text. Manually marked text may comprise text in a document that is unique to the document and will enable a user to identify the document.

In an embodiment, manually marked text in a scanned document may include text that is marked with a marker, such as a highlighter, such that the text is substantially covered with the ink of the highlighter but still visible (e.g., because the ink of the marker relatively transparent). The marker may have a bright or fluorescent color, for example.

In an embodiment, the text may be manually marked using a writing instrument, such as a pen. The herein described methods may, for example, recognize text that is underlined, circled, or outlined using the writing instrument.

In an embodiment, the text may be manually marked using electronic marking. For example, when a user electronically accesses the image data file of a scanned document, such as by using a client device or personal computer, the user may view the document on a display and be provided with the option move a cursor (e.g., of a mouse) to select text in the document of interest. The selected text may then be electronically marked using a highlighting option, alternate color, or other known methods of differentiating text in a scanned document.

In an embodiment, the manual marking of text may include a combination of methods of marking a document (e.g., manually with a writing instrument and electronically), and, therefore, the herein described method should not be limited.

Referring back to FIG. 1, after image data for the scanned document 102 is received, the manually marked text is recognized 104. The image data of the scanned document is then annotated 106, such as by tagging, using the manually marked text, and the annotated image data file for the scanned document is stored. The term annotate is intended to mean herein to note, define, or associate therewith.

In an embodiment, the tag may comprise the name (e.g., file name) of the scanned document, for example. As an example, if the marked text read "Claim 1234," the image data file may be saved as Claim1234.pdf. Thus, the method may further comprise generating recognized text 110 by recognizing the manually marked text, and tagging the scanned document with the recognized text that is generated. In an embodiment, a field associated with the scanned document may be populated 112 using the recognized text and/or the manually marked text. The field may be the name (e.g., file name) of the scanned document, for example. That is, the process or method as described may be used to assign names to scanned documents by recognizing and using the textual information extracted from the document.

In other embodiments, the recognized text on the scanned document may be provided to search fields or metadata in a format suitable for keyword searching or indexing.

The method(s) used to recognize the manually marked text on a scanned document may be a method such as the methods described in U.S. patent application Ser. Nos. 11/414,053 and 11/476,981, filed Apr. 27, 2006 and Jun. 26, 2006, respectively, which are hereby incorporated by reference in their entirety. The methods disclose the use of a two-layer multi-mask compression technology in a scanned export image path, wherein edges and text regions may be extracted, and, together with the use of mask co-ordinates and associated mask colors, the manually marked texts may be easily identified and extracted. Optical Character Recognition (OCR) and an appropriate association of the manually marked text(s) may then be used for further processing.

The method as generally described with reference to FIG. 1 eliminates a manual step for the user of having to access each scanned document, thus simplifying the scanning process. The method also provides a uniform method of annotating (e.g., tagging) documents with textual information. The method of naming a document using the described method results in a document name that is easy to recognize, sort, and use, particularly in massive computer storage systems.

Figure 2A:
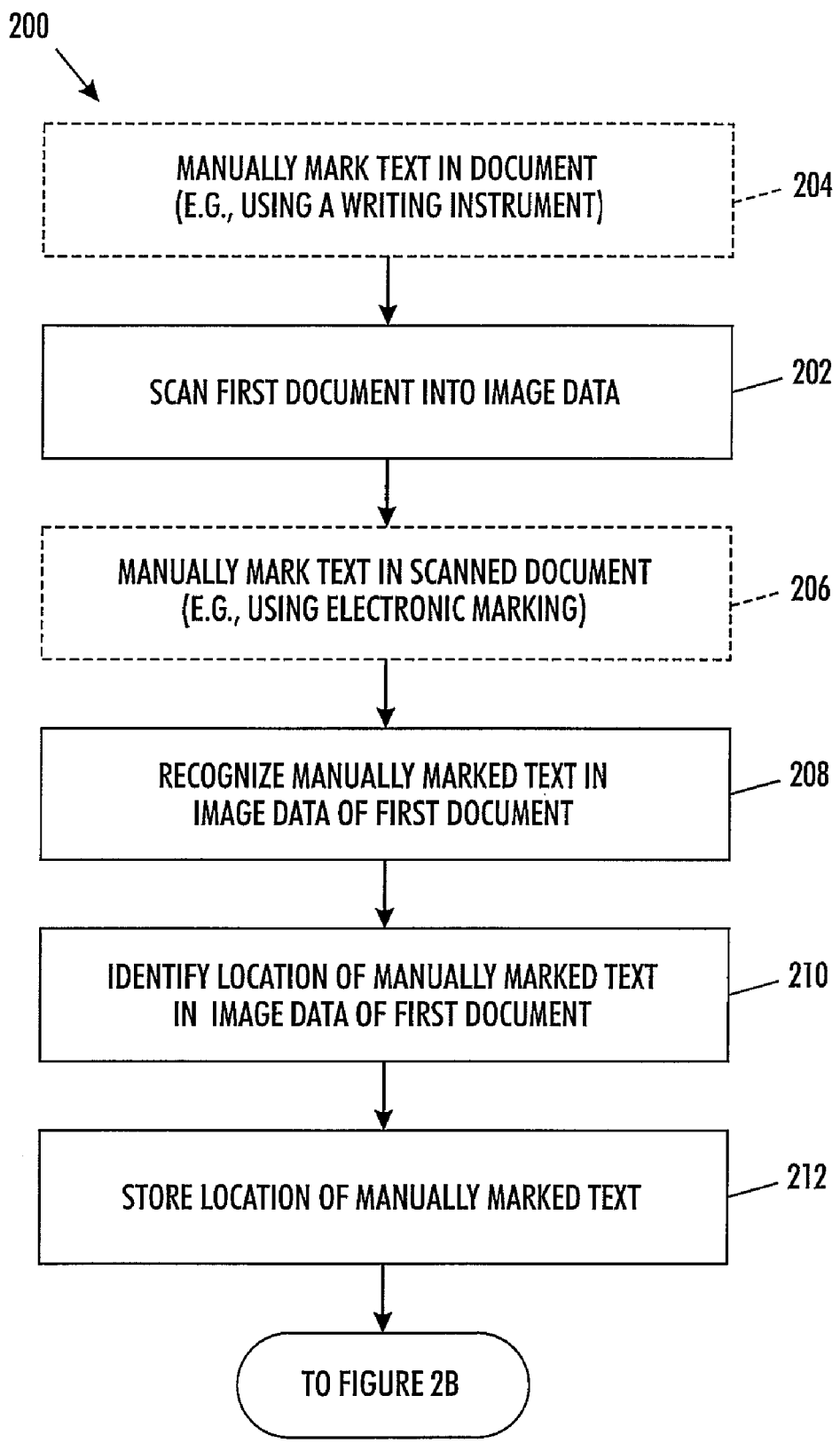
FIGS. 2A and 2B show a flow diagram depicting a method for automatically identifying and associating text with scanned documents in accordance with an embodiment of the present disclosure.
Figure 2B:
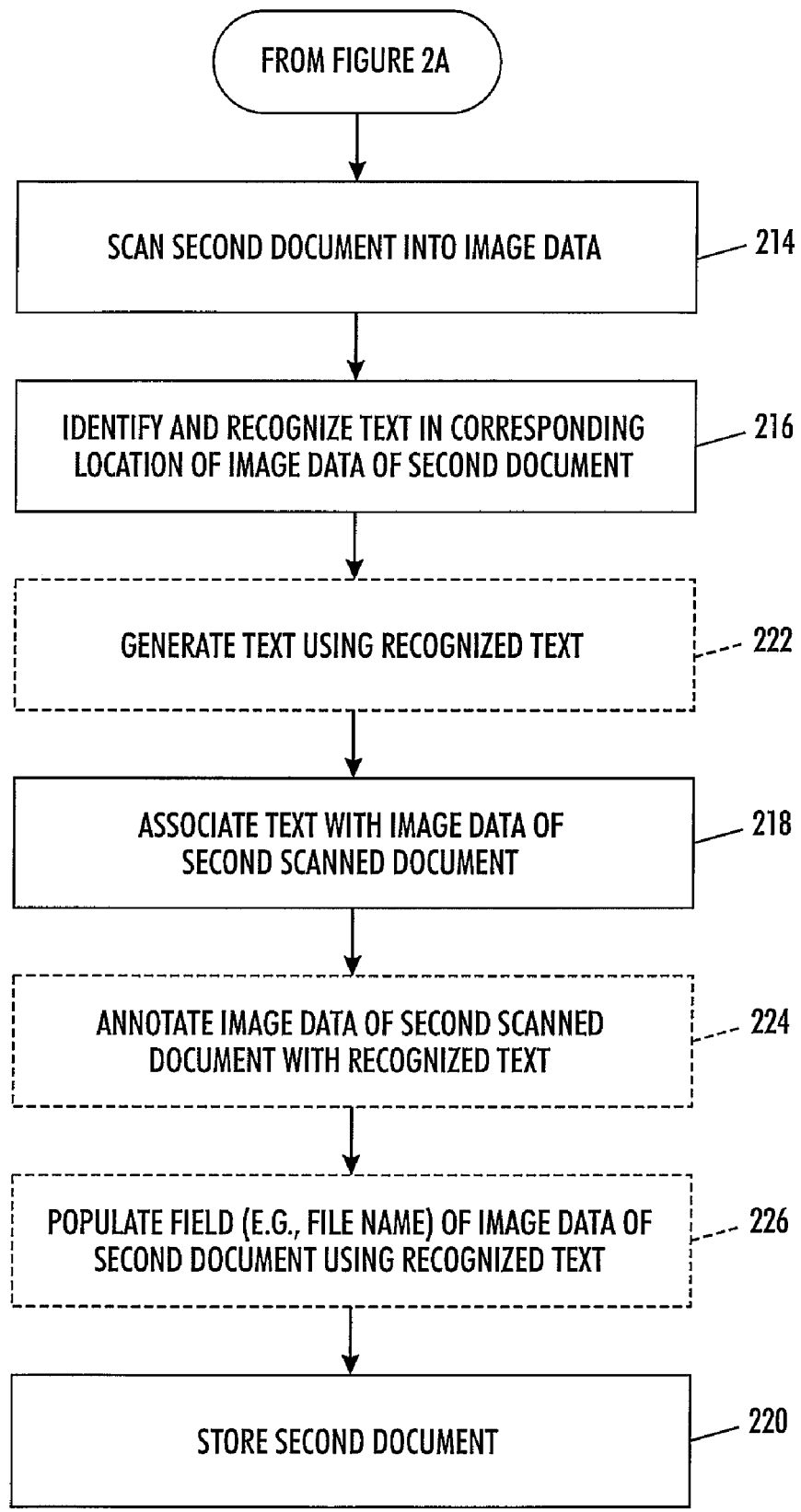

FIGS. 2A and 2B show a flow diagram depicting a method 200 for automatically identifying and associating text with scanned documents in accordance with an embodiment.

A first document is scanned into image data 202. In an embodiment, the text of the first document may be manually marked 204 using a writing instrument (e.g., a pen) or marker (e.g., such as a highlighter), as described above. In an embodiment, after scanning the first document into image data 202, the text of the image data may be manually marked using electronic marking 206, for example. In an embodiment, any known method of manually marking, highlighting, etc. or a combination of methods may be used to mark text in the first scanned document.

The manually marked text in the first scanned document is recognized 208. As described with reference to FIG. 1, 2-layer multi-mask compression technologies and OCR may be used to identify and/or recognize the manually marked text. In an embodiment, any known method or recognizing text that is selected or marked may be used. After recognition 208, the location of the manually marked text in the image data of the first scanned document is identified 210. The location of the manually marked text is then stored 212.

By storing the location of the textual information of the first document, a learned behavior is developed. More specifically, as shown in FIG. 2B, when a second document is scanned into image data 214, the location of the manually marked text in the first scanned document is used to identify a corresponding location in a second scanned document, such that a text in the corresponding location of the second scanned document is recognized 216 and associated with the second scanned document 218. The second document does not need to be manually marked for this to occur. In an embodiment, the method may further comprise annotating, such as by tagging, the second document with the text identified in the corresponding location in the second scanned document. The second scanned document may be stored 220 with the identified text.

In an embodiment, recognized text may be generated 222 in response to recognizing the text in the second scanned document. In an embodiment, the second scanned document may be annotated (e.g., tagged) with the recognized text 224. In an embodiment, a field associated with the second scanned document may be populated using the recognized text. For example, the field may be the name (e.g., file name) of the scanned document. In an embodiment, the method may include assigned the second scanned document a name used the text identified in the corresponding location in the second scanned document.

The above described method of FIGS. 2A and 2B may be particularly beneficial for heavy scanning applications of standard forms, such as in the work place or office. The term "standard form" is intended to mean herein forms that are regularly or commonly used and/or reused. For example, law offices deal may with legal documents and/or forms, health departments may deal with insurance documents and/or forms, and accounting or banking office may deal with financial documents and/or forms. The standard forms may contain the required text (e.g., letters, numbers, or words) in a fixed location in the document. Thus, rather than a user manually accessing and re-naming scanned documents of image data, the text may be used to automatically name the scanned document and/or exported file. The learned method, such as the method of FIGS. 2A and 2B, thereby simplifies a user's experience with scanned documents as the manual step of having to select each scanned document and manually re-name the documents (particularly in heaving scanning applications) is eliminated.

Figure 3A:
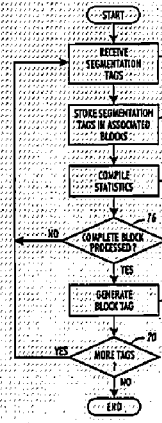
FIGS. 3A and 3B illustrate examples of a scanned document with manually marked text that is used to identify and associate the manually marked text therewith in accordance with an embodiment of the present disclosure.
Figure 3B:
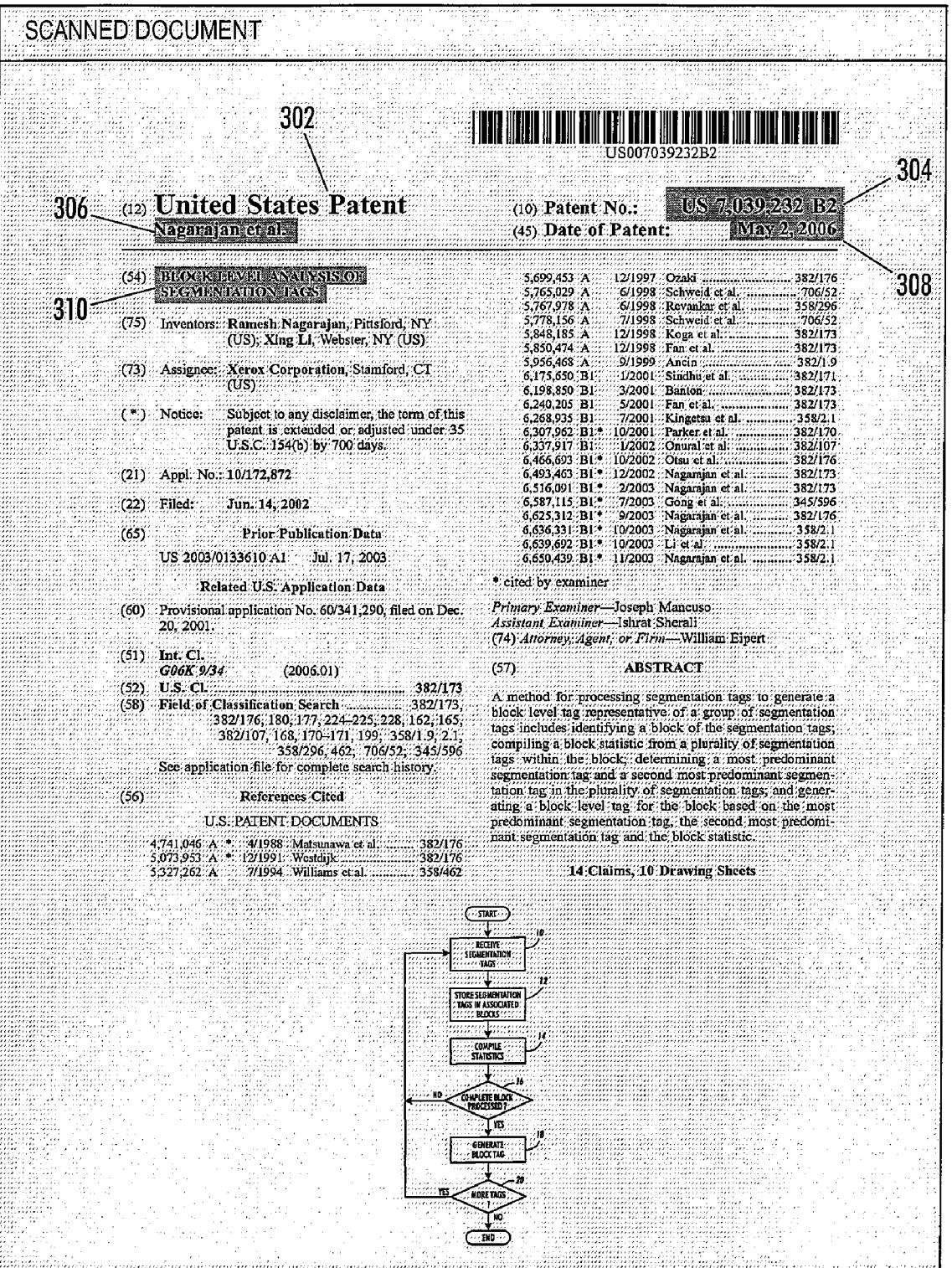

FIGS. 3A and 3B illustrate examples of a scanned document 300 with a unique identification number in a manually marked text region(s) 304-310 that may be used to identify and associate the manually marked text therewith in accordance with an embodiment. In the example as shown in FIG. 3A, the scanned document 300 generally contains image data 302 in the form of text (e.g., a U.S. Patent). The scanned document 300 also contains manually marked text 304, such as the patent number or words "US 7,039,232 B2." As noted above, the manually marked text may include marks made in a document that are differentiated from remaining marks of the document by a region which has substantially different gray scale that the background or marks of the original document.

As noted above, in an embodiment, such marks may be made, for example, by a user utilizing devices such as writing instruments (e.g., pens), markers (e.g., highlighters or highlighting devices that produce bright or fluorescent but relatively transparent colors), and the like on the page(s) of the document before scanning image data of the document. In an embodiment, the manually marked text may be entered by a user interacting with a user interface or input device 404. For example, a user may access a scanned document provided by a module (such as image module 402 as described with reference to FIG. 4) and view such document with a display device (e.g., monitor) to use a word processing program or the like toe electronically highlight or mark textual information within the document. In an embodiment, any combination of the methods above or other known methods may be used for marking.

FIG. 3B illustrates the marking of a number of areas 304, 306, 308, and 310 within a scanned document 300. The image data 302 (i.e., U.S. Patent) is tagged with the Patent No. 304, inventor name 306, date of patent 308, and title 310, respectively. The manually marked text 304-310 may be used to tag and associate with the scanned document 300, or to name the scanned document, for example. As noted above, the annotated or tagged information may be used for keyword searching or indexing purposes, such as by adding to the metadata of the image file.

Figure 4:
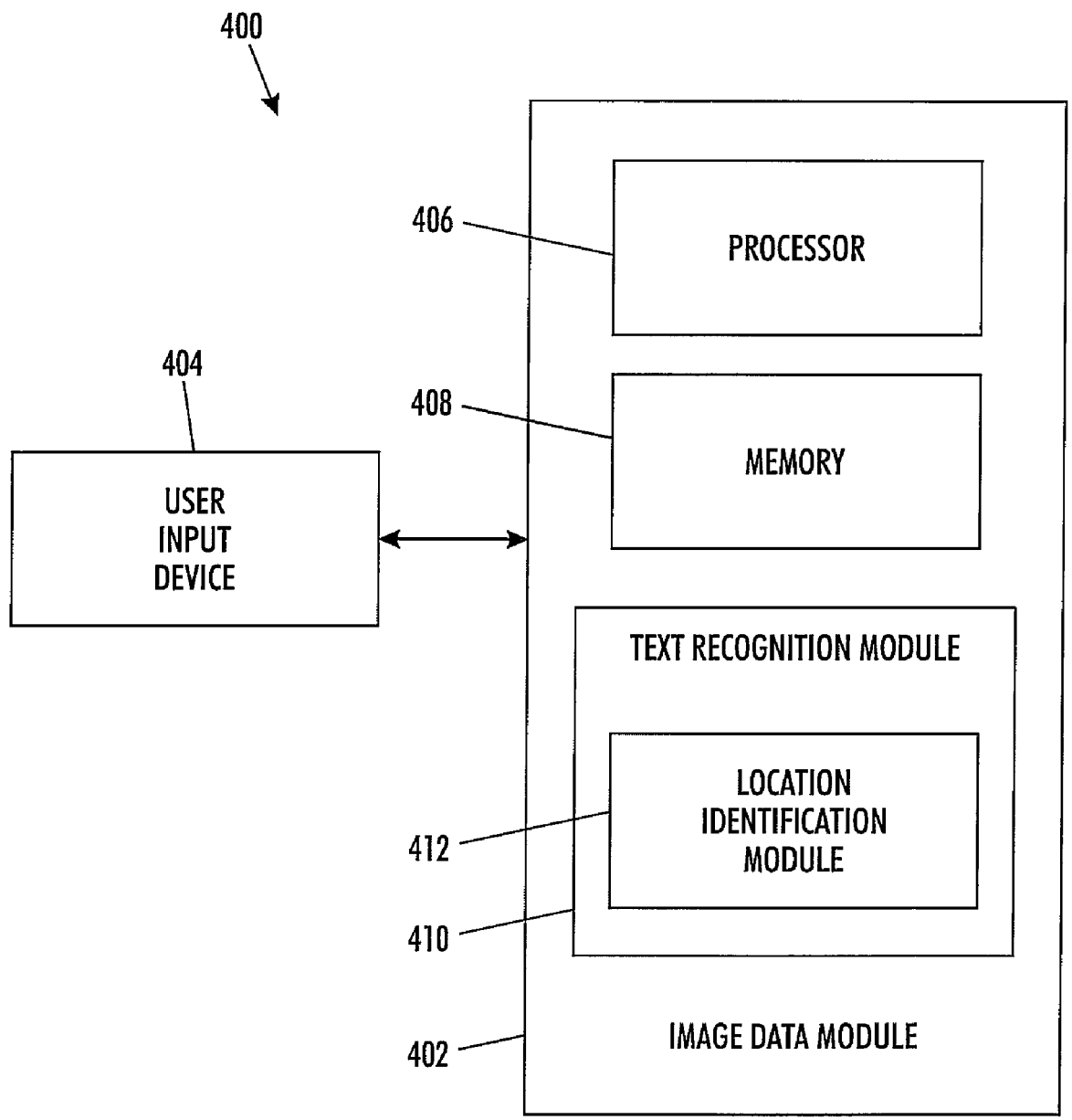
FIG. 4 illustrates a block diagram of a part of a data processing system that may be used for identifying, recognizing and associating text based on manually marked text in accordance with an embodiment of the present disclosure.

Based on the foregoing it can be appreciated that a system may be provided, based on one or more software modules as described above, which results in the extraction of highlighted regions in a scanned text document. FIG. 4 illustrates a block diagram of a part of a data processing system 400 that may be used for identifying, recognizing and associating text based on manually marked text in accordance with an embodiment of the present disclosure. Such a system 400 may be provided as, for example, an image data module 402 for converting a scanned text document (e.g., received from a scanning device or user input device 404) into image data. The scanning device or user input device 404 may comprise a device capable of scanning such as a scanner, multifunction printing device (MFP or MFD), or other known devices with scanning capabilities. The scanned document may be scanned into image data comprising a manually marked or highlighted region comprising a manually marked text, for example. The system may also include a module 410 for optically recognizing the manually marked text in order to recognize text to be extracted from the manually marked region of the scanned text document, and a module 410 for extracting the manually marked text from the manually marked region. The system may also include a processor 406; a module 412 for identifying the location of a manually marked text within a document; a memory module 408 for storing the location of the manually marked text; a module for tagging the documents with text or identified text in a corresponding location of a document; and a module for generating recognized text in response to recognizing the text in the scanned document.

Alternatively, a system for extracting manually marked regions in a scanned image document may be implemented, which includes a module for converting a scanned image document into a plurality of background regions and a plurality of mask regions; a module for analyzing the plurality of background regions utilizing one or more mask coordinates, wherein the plurality of background regions are located beneath one or more of the mask regions among the plurality of mask regions; and a module for optically recognizing a manually marked text in one or more mask regions, if the background regions beneath the mast region(s) comprises a uniform color.

The embodiments described herein may be integrated into a software architecture that aligns separate software technologies to produce a desired effect. Components from several software systems, along with a manually marked text extraction module, may enable automated extraction as described in greater detail below.

The embodiments described above may also be implemented in the context of a host operating system and one or more software modules. Such may constitute hardware modules, such as, for example, electronic components of a computer system. Such modules may also constitute software modules. In the computer programming arts, a software module may be typically implemented as a collection of routines and data structures that performs particular tasks or implements a particular abstract data type.

Software modules generally include instruction media storable within a memory location of a data-processing apparatus. A software module may list the constants, data types, variable, routines, and the like that may be accessed by other modules or routines. A software module may also be configured as an implementation, which can be private (e.g., accessible perhaps only to the module), and that contains the source code that actually implements the routines or subroutines upon which the module is based. The term "module" as utilized herein may therefore refer to software modules or implementations thereof. Such modules may be utilized separately or together to form a program product that may be implemented through signal-bearing media, including transmission media and recordable media.

It is important to note that, although the embodiments are described in the context of a fully functional data-processing apparatus (e.g., a computer system), those skilled in the art will appreciate that the mechanisms of the embodiments are capable of being distributed as a program product in a variety of forms, regardless of the particular type of signal-bearing media utilized to actually carry out the distribution. Examples of signal bearing media include, but are not limited to, recordable-type media such as floppy disks or CD ROMs and transmission-type media such as analog or digital communications links.

The embodiments disclosed herein may be executed in a variety of systems, including a variety of computers running under a number of different operating systems. The computer may be, for example, a personal computer, a network computer, a mid-range computer or a mainframe computer. In the preferred embodiment, the computer is utilized as a control point of network processor services architecture within a local-area network (LAN) or a wide-area network (WAN).

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that the objects of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A method for associating one or more selected portions of text with image data of a document containing the one or more selected portions of text, the method comprising:
   receiving image data for the document with the one or more selection portions of text manually marked for recognition;
   recognizing the one or more selected portions of text in the received image data;
   associating the recognized one or more selected portions of text with the received image data;
   generating text in response to the recognizing of the one or more selected portions of text, the generated text being generated from the recognized one or more selected portions of text;
   naming the received image data of the document with a name using the generated text, and
   after the naming, storing the received image data of the document with the name.

2. A method according to claim 1, wherein the image data for the document is created by scanning.

3. A method according to claim 1, further comprising:
   populating a field associated with the received image data for the document using the generated text.

4. A method for automatically identifying and associating text with scanned documents, the method comprising:
   scanning a first document into image data, the first document comprising one or more selected portions of text that are manually marked for recognition;
   recognizing the one or more selected portions of text in the image data of the first scanned document;
   identifying a location of the recognized one or more selected portions of text in the image data of the first scanned document;
   storing the location of the recognized one or more selected portions of text, and, thereafter:
   scanning at least a second document into image data; and
   storing the image data for the at least second scanned document,
   wherein the location of the recognized one or more selected portions of text in the first scanned document is used to identify a corresponding location in the at least second scanned document, such that text in the corresponding location of the at least second scanned document is recognized, and wherein the method further comprises associating the image data of the at least second scanned document with the recognized text identified in the corresponding location of the at least second scanned document, and assigning a name to image data for the at least second scanned document using the text identified in the corresponding location of the at least second scanned document before storing the at least second scanned document.

5. A method according to claim 4, further comprising:
   populating a field associated with the image data for the at least second scanned document using the recognized text in the corresponding location of the at least second scanned document.

6. A system for automatically identifying and associating text in a scanned document, the system comprising:
   a scanner for scanning a first physical document having one or more selected portions of text that are manually marked into image data, the scanner configured to form a first scanned document of image data corresponding to the first physical document and configured to scan at least a second physical document to form at least a second scanned document of image data corresponding to the at least second physical document;
   a module for recognizing the one or more selected portions of manually marked text in the image data of the first scanned document;
   a module for identifying a location of the recognized one or more selected portions of manually marked text in the image data of the first scanned document;
   a module for storing the location of the recognized one or more selected portions of manually marked text of the first scanned document,
   wherein the module for identifying the location of the recognized one or more selected portions of manually marked text in the first scanned document is configured to identify a corresponding location in the at least second scanned document and configured to recognize text in the corresponding location of the at least second scanned document, and wherein the system further comprises: a module for generating text in response to recognizing the text in the corresponding location of the at least second scanned document,
   a module for assigning the image data of the at least second scanned document a name using the generated text before storing the second scanned document, and
   a module for storing the image data for the at least second scanned document with the assigned name.

7. A system according to claim 6, further comprising:
   a module for populating a field associated with the image data of the second scanned document using the recognized text in the corresponding location of the at least second document.

8. A method according to claim 1, wherein the method further comprises tagging the received image data of the document with a tag using the generated text.

9. A method according to claim 4, wherein the method further comprises tagging the image data of the second scanned document with a tag using the recognized text identified in the corresponding location of the second scanned document.

10. A system according to claim 6, further comprising:

an electronic module for tagging the image data of the second scanned document with a tag using the generated text.

* * * * *